United States Patent Office 3,197,840
Patented Aug. 3, 1965

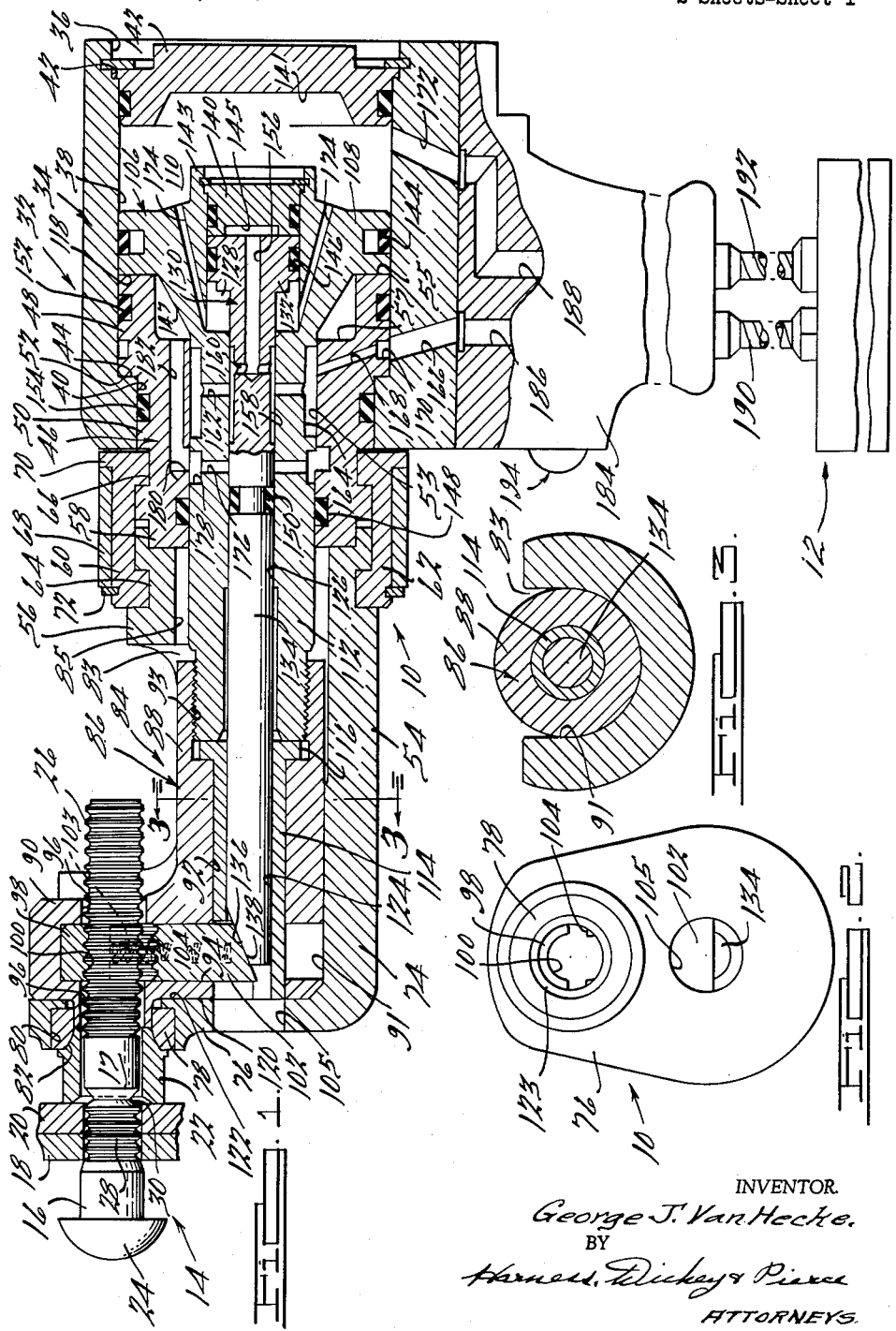

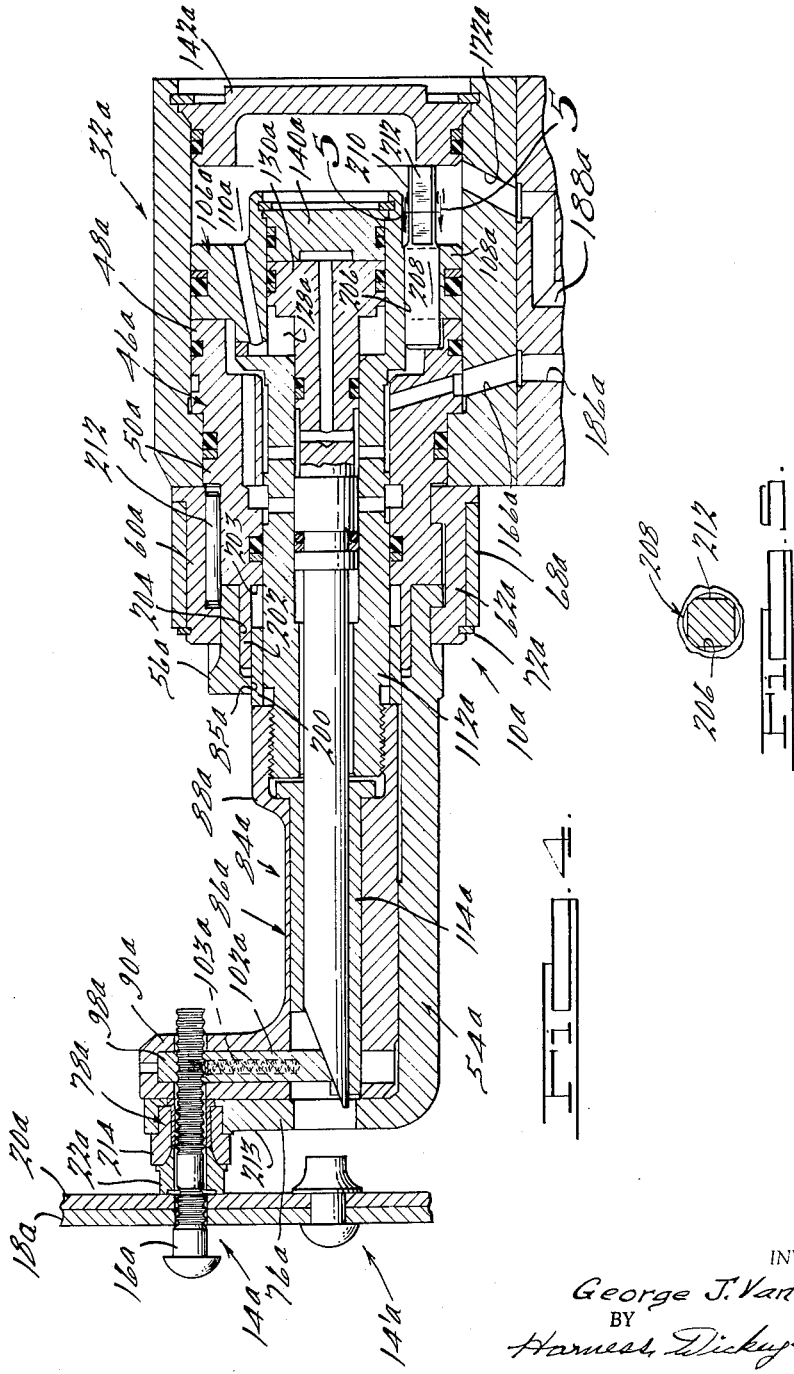

3,197,840
CLEARANCE ATTACHMENT TOOL
George J. Van Hecke, Detroit, Mich., assignor to Huck Manufacturing Company, Detroit, Mich., a corporation of Michigan
Filed Oct. 9, 1963, Ser. No. 314,924
27 Claims. (Cl. 29—34)

This invention relates to tools for driving fasteners and more particularly for driving fasteners of the two-piece type which are set by the application of a relative axial force between the two pieces.

While the tool of the present invention is capable of use with a variety of two-piece fasteners, its operation will be discussed in conjunction with a two-piece fastener of the lockbolt type as shown and described in the patent to L. C. Huck, No. 2,531,048, issued November 21, 1950. In setting a lockbolt the conventional tool is placed in line with the pin of the lockbolt and has considerable bulk which extends directly in line from the lockbolt. In open areas these tools can be freely used; however, in small clearance areas such as channels, etc., these tools cannot be used. The tool of the present invention has little structure immediately in line with the fastener and can be used in such small clearance areas. It is an object of this invention to provide a tool capable of use in small clearance areas for setting fasteners of the above-described type.

Conventional tools grip the pin of the fastener by means of a chuck jaw assembly located in a collet with the chuck jaw assembly being actuated by axial movement of the collet. Thus, before the pin can be gripped, the collet and chuck jaw assembly must be moved a distance away from the fastener. This requires the pin to have a pintail portion of adequate length to permit gripping by the chuck jaw assembly and hence its length must compensate for this distance; this distance also adds to the amount of clearance required to grip and set the fastener. The tool of the present invention utilizes a novel chuck jaw construction in which the pin of the fastener is gripped without the necessity of movement of the chuck jaws axially away from the fastener. It is another object of this invention to provide a novel tool for setting fasteners of the above-described type in which the fastener can be provided with a pin having a pintail of reduced length. It is still another object of this invention to provide a novel tool for setting fasteners of the above-described type having a novel chuck jaw construction which grips the pin of the fastener without the necessity of axial movement of the chuck jaws relative to the fastener.

It is a general object of this invention to provide a tool having a novel construction for setting fasteners of the above-described type.

The manner of accomplishing the foregoing objects, and other objects and features of the invention, will become apparent from the following detailed description of an embodiment of the invention when read with reference to the accompanying drawing in which:

FIGURE 1 is a side elevational, partially sectional view of a tool, embodying a preferred form of this invention, shown in assembly relationship with a source of power for actuating the tool and with a fastener of a type to be set by the tool;

FIGURE 2 is a front elevational view of the tool shown in FIGURE 1;

FIGURE 3 is a cross-sectional view of the tool of FIGURE 1 taken substantially along the line 3—3 in FIGURE 1;

FIGURE 4 is a view similar to that of FIGURE 1 of a modified form of the tool of FIGURE 1; and FIGURE 5 is a blown up cross-sectional view of a valve construction of the tool of FIGURE 4 taken substantially along the line 5—5 in FIGURE 4.

Looking now to FIGURE 1, a tool assembly 10, embodying the features of this invention, is shown in assembly relationship with a source of hydraulic pressure 12 and with a fastener 14. The fastener 14, for representative purposes only, is shown to be of the lockbolt type and includes a collar 22 and a pin member 16 having a shank 17 shown to be extending through a pair of aligned bores in a pair of workpieces 18, 20 to be secured. The pin member 16 has at one end of the shank 17 an enlarged head 24 which is engageable with one workpiece 18; the collar 22 is placed over the shank 17 and in engagement with the other workpiece 20. In setting the fastener 14, the pin 16 is gripped at a plurality of pull grooves 26 at the end of the shank 17 opposite the head 24 and a swaging anvil engages the collar 22. A relative axial force is then applied between the pin 16 and the collar 22 until the head 24 engages the workpiece 18; as this force is increased, the anvil swages the collar into a plurality of locking grooves 28 in the shank 17 thereby securing the collar 22 and pin 16 together. As the relative force is increased the end or pintail portion of the pin 16 is severed from the shank 17 at a reduced diameter break-neck 30. A lockbolt, such as 14, is shown in a set position, prior to fracture of the pintail in FIGURE 2 of the previously referred to Huck patent.

In general the tool 10 has a drive piston 106 which is hydraulically actuated to move a collet 84 reciprocably relative to the fastener 14. The collet 84 has a chuck jaw assembly having an opening for receiving the shank 17 of pin 16 with the axis of the opening laterally offset from the axis of the drive piston 106. By laterally offsetting the chuck jaw assembly from the drive piston 106, the area directly behind the chuck jaw assembly can be opened thereby providing clearance for operation in channels, etc.

More specifically the tool 10 has at its rearward end, a cylinder housing assembly 32 which includes an outer cylinder housing 34 having a central aperture extending therethrough which is defined by coaxial bores 36, 38 and 40. The bores 36, 38 and 40 are of decreasing diameters respectively, with a pair of radially inner shoulders 42 and 44 being defined by the juncture of bores 36 and 38 and 38 and 40, respectively. The cylinder housing assembly 32 also includes an inner cylinder housing 46 which fits telescopingly within the outer housing 32 and has an end portion 48 and a reduced diameter forward portion 50 located matably within bores 38 and 40, respectively. The inner housing 46 has a radially outer shoulder 52 defined by the juncture of portions 48 and 50 which is engageable with inner shoulder 44 of outer housing 32. The forward portion 50 extends outwardly beyond the forward end of outer housing 32 while the rearward portion 48 extends only partially coextensively within the bore 38. A bore 53 extends through the inner cylinder housing assembly 46 coaxially relative to the bore 38 and communicates with a counterbore 57 in the rearward face 55 of housing 46. The counterbore 57 and a portion of the bore 38 define a cylinder 110 in which the drive piston member 106 reciprocates.

An elongated collet housing 54 has an annular end portion 56 in telescoping engagement over a reduced diameter portion 58 at the outer end of the forward portion 50 of the inner housing 46. The collet housing 54 and inner cylinder housing 46 are axially held together by a pair of semi-cylindrical shell members 60 and 62, each having a generally U-shaped cross-section and each having one leg of the U located in an annular groove 64 in the radially outer surface of the end portion 56 and the other leg of the U located in an annular groove 66 in the radially outer surface of the forward portion 50 of the inner housing 46. The shells 60 and 62 are held together by an annular sleeve 68 which fits matingly over their outer surfaces and which is axially restrained in one direction by an outwardly extending shoulder 70 at one end of shells 60 and 62 and by a snap ring 72 located in a groove in the opposite end of shells 60 and 62. The rearward ends of shells 60 and 62 are proximate the forward face of outer cylinder housing 34 and along with sleeve 68 and snap ring 72, thereby holds the outer cylinder housing 34, the inner cylinder housing 46 and the collet housing 54 together.

The collet housing 54 has a forward portion 74 which extends longitudinally from the end portion 56 and which terminates at its forward end in a generally flat anvil portion 76. The anvil portion 76 extends transversely upwardly from and partially beyond the remainder of the forward portion 74. A tubular anvil member 78 is matably located in a counterbore in a longitudinally extending through bore 80 in the anvil portion 76. The anvil member 78 can be of a conventional construction well known in the art and has a flared opening 82 defined by a surface engageable with the collar 22 for swaging the collar 22 to the pin 16. The top of the forward portion 74 behind the anvil portion 76 is opened and has a generally semi-cylindrical concave cavity 83 defined by an internal surface 91 for receiving and permitting movement of the collet assembly 84 therein. The end portion 56 of collet housing 54 has a through bore 85 which is of a slightly larger diameter than the bore 53 in the inner cylinder housing member 46. The bores 36, 38 and 40 in the outer cylinder housing 34, the bores 53 and 55 in the inner cylinder housing 46 and the bore 85 and cavity 83 of the collet housing 54 all extend longitudinally and are in coaxial alignment. The opening 82 in anvil 78 is laterally offset a sufficient distance relative to the latter bores such that the area proximate the rear of anvil 78 is clear.

The collet assembly 84 includes a collet body 86 which has an elongated tubular portion 88 integral with a jaw housing 90 located at its forward end. The jaw housing 90 extends laterally from and partially beyond the tubular portion 88. The internal surface 91 of cavity 83 of the forward portion 74 of the collet housing 54 is contoured similarly to the outer surface of the tubular portion 88. Thus the collet body 86 which is located within the forward portion 74 of the collet housing 54 fits matably and slidably within cavity 83. A bore 92 extends through the tubular portion 88 and terminates in a partially threaded counterbore 93 at its rearward end. A generally rectangular aperture 94 extends from the bottom of collet body 86 through the tubular portion 88 in communication with bore 92 and upwardly partially into the jaw housing 90. A bore 96 extends longitudinally through the jaw housing 88 and transversely through the aperture 94. The bore 96 which has its axis spaced above the axis of the bore 92 is located relative to the lower surface of the collet body 86 such as to be coaxial with the flared bore 82 in the anvil 78. The bore 96 is offset a sufficient distance from the tubular portion 88 such that the area proximate to its rearward end is clear. The anvil portion 76 and jaw housing portion 90 are provided of a minimum width; the cylinder housing assembly 32 defines an unconfined clearance space in the area immediately adjacent to the anvil portion 76 whereby the tool 10 can be used in small clearance areas. This clearance permits use of the tool 10 in channels, etc.

The annular ring 123 surrounds the bore 96 and extends axially outwardly from the forward face 120 of the jaw housing 90 and is movable concentrically, partially within the flared bore 82 of the anvil 78. The ring 123 acts as a collar ejector in a manner to be seen.

An upper jaw member 98 is fixed in the upper portion of the aperture 94 in the jaw housing 90. The jaw member 98 has a substantially semicircularly shaped inner surface 100 having a plurality of radially projecting annularly extending teeth which extend into the bore 96. A lower jaw member 102 is slidably located within the aperture 94 just below the bore 96 and also has a substantially semicircularly shaped inner surface 104 having a plurality of radially projecting annularly extending teeth which extend toward the bore 96 oppositely from the teeth on fixed jaw member 98. The teeth on the surfaces 100 and 104 of the jaw members 98 and 102, respectively, are provided with a contour similar to the contour of the gripping grooves 26 of the pin 16 whereby the jaw members 98 and 102 are capable, in a manner to be seen, of gripping the pin 16. While the teeth on surfaces 100 and 104 are shown to be individual semi-anular members, the teeth could extend helically for engagement with a threaded shank; the surfaces 100 and 104 could be provided with teeth for gripping a pin having a plain or smooth shank. The movable jaw member 102 is urged downwardly away from the fixed jaw member 98 by a pair of biasing springs 103. After gripping the pin 16 by jaws 98 and 102, the fastener 14 is set by a relative axial force applied between the pin 16 and collar 22. To apply this relative force the collet body 84 is fixed to and movable with the drive piston member 106.

The drive piston member 106 has its head 108 located for reciprocable movement within the cylinder 110 defined by a portion of bore 38 and by counterbore 57. A rod 112 extends coaxially from the head 108 and matably through the bore 53 in the inner housing 46 and in clearance relationship through the bore 85 in the end portion 56 of collet housing 54 and into the cavity 83. The forward end of rod 112 is externally threaded and is threaded into the threaded counterbore 93 of the collet body 86 whereby the collet body 86 is moved by the piston member 106. The collet assembly 84 includes a cylindrical bushing 114 which is located within the bore 92 in the collet body 86 and which has an annular flange 116 located in counterbore 93. The flange 116 is of a selected thickness such that when the rod 112 of piston 106 is threaded tightly into counterbore 93 of the collet body 86 moving the flange 116 against the end of counterbore 93 and with the piston 106 in its forwardmost position in cylinder 110, the forward face 118 of the piston head 108 engages the rearward face 55 of the inner housing 46 and the forward face 120 of the jaw housing 90 of collet body 86 is proximate the inner surface 122 of the anvil portion 76. While the drive piston member 106 is actuable to move the collet assembly 84, a jaw lock piston 130 is actuable to move the lower jaw member 102 toward the fixed jaw 98 whereby the pin 16 of the fastener 14 can be gripped.

The jaw lock piston 130 has a piston head 132 reciprocably located within a cylinder 128 in the drive piston head 108 and has a longitudinally extending rod 134 extending matably, coaxially through a central bore 126 in rod 112 of drive piston 106 and through a bore 124 in bushing 114. The bore 124 in bushing 114 is similar in size to the bore 126 in drive piston 106 with the bore 126 being radially relieved at the forward end of rod 112 and communicating at its opposite end with the cylinder 128 in piston head 108. The rod 134 terminates at its free end in a radially inwardly inclined flat surface 136 which is engageable with a similarly inclined surface 138 at the lower extremity of the movable lower jaw 102. With the jaw lock piston 130 in its rearwardmost position, as shown in FIGURE 1, the inclined surface 138 of lower jaw member 102 is at the bottom of the inclined surface 136 and hence the lower jaw member 102 is moved downwardly via springs 103 away from the aperture 96 in the jaw housing 90 and out of engagement with the pin 16. With the jaw lock piston 130 in its forwardmost position, the inclined surface 138 of jaw member 102 is moved upwardly along the inclined surface 136 and hence the lower jaw member 102 is moved upwardly toward the aperture 96 in jaw housing 90 and into engagement with the pin 16. The anvil portion 76 has an opening 105 in line with the lock piston 130 into which the piston 130 can partially extend in its forwardmost position.

The upper portion of the bushing 114 terminates short of the rectangular aperture 94 thus permitting the lower jaw member 102 to move into the bore 92 in the tubular portion 88 of the collet body 86. The lower portion of the bushing 114 extends beyond the aperture 94 and hence blocks the lowermost portion of aperture 94 and thereby prevents the movable lower jaw 102 from accidentally sliding too far, i.e., through the bore 92.

A cap 140 is radially stepped and is telescopically matable within the outer counterbored end of the cylinder 128 for sealing that end of the cylinder; the cap 140 is held in place by a snap ring located in a circumferential groove in the counterbore. In a similar manner a cap 142 is telescopically matable within bores 36 and 38 for sealing the rearward end of bore 38, and hence of cylinder 110, and is retained in place by a snap ring located in a radial groove in the counterbore 36. The caps 140 and 142 are provided with annular seals for sealing the associated cylinders.

The cap 142 has a cavity 141 and the piston head 108 terminates at its rearward end in a reduced diameter, axially extending projection 143. In operation, with the drive piston 106 in its rearwardmost position the projection 143 engages the end wall of the cavity 141 and spaces the remainder of the head 108 from the cap 142; this facilitates porting to the head side of cylinder 110, and as will be seen, also permits clearance for fluid to enter cylinder 110 for driving piston 106 in a forward direction. The forward face 118 of the drive piston 106 is connected to the rod 112 by a radially inwardly converging surface 147. With the drive piston 106 in its forwardmost position (as shown in FIGURE 1) the inclined surface 147 defines a space within the counterbore 57 in the inner cylinder housing assembly 46; this space facilitates porting to the rod end of the piston 106 and also permits clearance for fluid to enter cylinder 110 for driving the piston 106 in a rearward direction. A cavity 145 in the cap 140 serves a similar purpose as the cavity 141 in cap 142.

The piston head 108 of the drive piston 106 has an annular sealing ring 144 for providing a seal between opposite sides of the head 108 within the cylinder 110. In a similar manner, an annular seal 146 in the piston head 132 of the lock piston 130 seals between opposite sides of the head 132 within the cylinder 128. An annular seal 148 in a groove in bore 53 of the inner cylinder housing 46 seals between bore 53 and the rod 112 of drive piston 106 and hence seals the rod end of cylinder 110. An annular seal 150 in a groove in rod 134 of lock piston 130 seals between rod 134 and bore 126 in rod 112 of drive piston 106 and hence seals the rod end of cylinder 128.

Annular seals 152 and 154 in portions 48 and 50, respectively, of inner housing 46 provide seals with bores 40 and 38, respectively, of outer housing 34 and hence seal between the inner and outer cylinder housings 46 and 34, respectively.

In using the tool 10, a fastener, such as fastener 14, has the shank 17 of the pin 16 inserted through the bores 96 and through the opening between chuck jaws 98 and 102. At this time the drive piston 106 is in its forward position in the cylinder 110 and the jaw lock piston 130 is in its rearward or retracted position in the cylinder 128 (see FIGURE 1.) With the lock piston 130 retracted the lower, movable jaw member 102 is in its lower position away from bore 96 permitting the pin 16 to be inserted therethrough. At this time the anvil 78 is in engagement with the collar 22.

Before the pin 16 can be pulled, the lower jaw 102 must be moved upwardly to grip the shank 17. In conventional tools, the chuck jaws must be moved axially rearwardly prior to engagement with the shank. With the tool 10, the pin 16 is gripped prior to movement of the drive piston 106 and thence the collet assembly 84 (which includes chuck jaws 98, 102).

In operation fluid under pressure is applied to the head end of the cylinder 128 through an inlet passageway to be presently described. A bore 156 extends axially through the piston head 132 and partially in the rod 134 of the jaw lock piston 130 and has one end communicating with the head end of cylinder 128. The opposite end of the bore 156 is in communication with an elongated annular groove 158 in the outer surface of the rod 134 via a diametrical through bore 160. A closed passage is defined by the groove 158 and the surface defining the bore 126 in rod 112. The passage defined by groove 158 is in turn in communication with a diametrical through bore 162 in rod 112 of drive piston 106 which is in turn in communication with an elongated annular groove 164 in the outer surface of the rod 112. A closed passage is defined by the groove 164 and the surface defining the bore 53 in the inner cylinder housing 46. The inner cylinder housing 46 has an annular groove 170 in the outer surface of the rearward portion 48 which defines a closed passage with the surface of outer cylinder housing 34 defining the bore 38. The groove 170 is in communication with the passage defined by the groove 164 via a radial bore 168. A radial bore 166 near the forward end of the outer cylinder housing 34 is in communication with the passage defined by groove 170. Thus fluid under pressure can be applied to the head end of cylinder 128 through the inlet passageway defined by bore 166, the passage defined by groove 170, bore 168, the passage defined by groove 164, bore 162, the passage defined by groove 158, bore 160 and bore 156.

At the same time that the head end of cylinder 110 is in fluid communication with the return side of the source of pressure via a radial bore 172 near the rearward end of the outer cylinder housing 34. The rod end of the cylinder 128 is in communication with the head end of cylinder 110 via a plurality of axially extending, radially inclined bores 174 in the piston head 108.

With fluid pressure applied to the head end of the cylinder 128 the jaw lock piston 130 is moved forwardly and the fluid in the rod end of cylinder 128 is expelled to the return side of the source via bores 174, the head end of cylinder 110 and bore 172. At this time neither side of the cylinder 110 is communicated to the pressure side of the source. As the lock piston 130 is moved forwardly the lower, movable jaw member 102 is moved upwardly gripping the shank 17 of pin 16 against the fixed jaw member 98.

As the lock piston 130 reaches the end of its stroke, the passage defined by groove 158 is moved into communication with a fluid path opening to the rod side of the cylinder 110. A diametrical bore 176 through the rod 112 of drive piston 106 has its radially inner openings blocked by the rod 134 with lock piston 130 in its rearward position. As the lock piston 130 reaches the end of its stroke the passage defined by groove 158 communicates with the bore 176. An annular groove 178 in the outer surface of the rod 112 is in communication with bore 176 and defines a fluid passage with the surface of the forward portion 50 defining bore 53. An annular groove 180 in the surface of the bore 53 is in communication with the cavity defined by groove 178. An axially extending bore 182 in the inner cylinder member 48 communicates the rod end of cylinder 110 with the groove 178. The groove 158 in rod 134 of lock piston 130 is wide enough such that with the lock piston 130 in its forward position it communicates both the bores 162 and 176 in the rod 112. Thus, when the lock piston 130 moves to its forward position causing the jaws 98, 102 to grip the pin 16, fluid pressure from the source is applied to the rod end of cylinder 110 via a primary fluid passageway comprising bore 166, the passage defined by groove 170, bore 168, the passage defined by groove 164, bore 162, the passage defined by groove 158, bore 176, the passage defined by groove 178, groove 180 and bore 182.

With fluid pressure applied to the rod side of cylinder 110 the drive piston 106 is moved rearwardly; fluid is expelled from the head side of cylinder 110 to the return side of the source via bore 172. The groove 164 in the rod 112 is located near the piston head 108 such that after the drive piston 106 has traveled a short distance, the groove 164 is in direct communication with the rod end of cylinder 110. Thus a secondary fluid passageway from the pressure side of the source to the rod end of cylinder 110 is defined by bore 166, the passage defined by groove 170, bore 168, and groove 164. The grooves 178 and 180 of the primary fluid passageway, previously defined, are initially in communication with each other with the drive piston 106 in its forward position and remain in communication as piston 106 moves rearwardly until the groove 164 communicates with cylinder 110; with further rearward movement of piston 106 the groove 178 is moved out of communication with the groove 180 thereby interrupting the primary fluid passageway to the cylinder 110. At this time, however, fluid pressure is still applied to the rod end of cylinder 110 moving the drive piston 106 to its rearward position.

During this rearward movement of drive piston 106, the jaw lock piston 130 is held in its forward position thereby maintaining the jaws 98, 102 against the pin 16. The force on the pin 16 is reacted against the collar 22 by means of the anvil 78. This relative force first pulls the head 24 of the pin 16 against the workpiece 18 and locates the locking grooves 28 concentrically with the collar 22. An increase in this force causes the anvil 78 to move over the collar 22 swaging the collar 22 into the locking grooves 28. With a further increase in this force, the shank 17 of the pin 16 is severed at the breakneck groove 30 completing the setting operation. The swaged collar 22 is then ejected from the anvil 78 in a manner to be described.

To eject the collar 22 and in order to prepare the tool 10 to receive another fastener the operator, by means to be described, now switches the bore 172 to the pressure side of the source and the bore 166 to the return side. Thus fluid under pressure is applied to head end of cylinder 110 and from there to the rod end of cylinder 128 via the bores 174. This causes the drive piston 106 to move forwardly and the jaw lock piston 130 to move rearwardly. As the latter piston is moved rearwardly fluid from the head end of cylinder 128 can be ejected through the inlet passageway, previously described, and returned to the return side of the source. As the drive piston 106 moves forwardly fluid from the rod end of cylinder 110 is initially ejected through the secondary fluid passageway previously described, and returned to the return side of the source. After the drive piston 106 has been moved forwardly a distance at which the groove 164 no longer communicates with cylinder 110 thereby interrupting return flow through the secondary fluid passageway and with the jaw lock piston 130 returned to its rearward position interrupting return flow through the primary fluid passageway, fluid from the rod end of cylinder 110 is forced back to the return side of the source through a slight clearance provided between the bore 53 and the rod 112 near the inclined surface 147.

With the jaw lock piston 130 in its rearward position, the lower jaw 102 can move downwardly away from bore 96 thereby releasing the severed portion of the shank 17 of pin 16. As the drive piston 106 returns to its forward position, the collar ejector ring 123 is moved against the collar 22 thereby ejecting the collar 22 from the anvil 78. Thus one fastener has been set and the tool 10 is in condition to receive the next fastener.

The tool 10 can be used with a remote power unit 12 which can be of the type disclosed in my Patent No. 3,052,099, issued September 4, 1962. The tool 10 has a handle 184 attached to one side of the outer cylinder housing member 34. The handle has passageways 186 and 188 in fluid communication with bores 166 and 172, respectively, and connected to the power unit 12 via flexible conduit members 190 and 192, respectively. A trigger 194 is located on handle 184 and is actuable to control the power source in the manner described in my abovementioned patent whereby in one position of trigger 194 fluid under pressure is transmitted to the tool 10 via conduit 190 and fluid is returned to reservoir via conduit 192 and in another position of trigger 194 fluid under pressure is transmitted to tool 10 via conduit 192 and is returned to reservoir via conduit 190.

Additional features for a tool of the present invention are shown in the embodiment of FIGURE 4. Looking now to the embodiment of FIGURE 4, components serving similar functions as like components in the embodiment of FIGURES 1–3 have been given the same number with the subscript "a." The tool assembly 10a, which is generally the same as tool assembly 10, has in addition means for limiting the stroke of the tool or the axial distance which the drive piston 106a can travel. To accomplish this, an annular limiting ring 200 is located coaxially about the rod 112a of drive piston 106a and against the rearward surface of the tubular portion 88a of the collet body 86a. The reduced diameter forward portion 50a of the inner cylinder housing 46a has an annular projection 202 extending forwardly from a radial forward face 203 and located matably within a counterbore 204 at the rearward end of bore 85a in the end portion 56a of collet housing 54a. The limiting ring 200 is movable coaxially within the projection 202 and has its forward end engagable by the rearward end of the collet body 86a. As the drive piston 106a moves rearwardly its rearward movement is stopped when the rearward end of the limiting ring 200 engages the forward face 203 of housing 46a. By properly selecting the length of the limiting ring 200 the stroke of piston 106a can be set to suit any particular clearance.

Where clearance is not critical the ring 200 can be eliminated and the full stroke of the piston 106a can be utilized. Since the piston 106a is not moved forwardly unless the tool 10a is properly actuated by the operator, it is possible for high pressures to be maintained after the piston 106a reached the rearward end of its stroke. With the full stroke of the piston 106a being used, the piston 106a at its rearwardmost position engages the cap 142a. In order to prevent damage to cap 142a as well as damage to seals, etc., caused by the maintenance of high pressures, valve means are provided which, with the piston 106a in its rearwardmost position, fluid communicates both sides of the cylinder 110a. The head 108a of the piston 106a has a radially offset, longitudinally extending bore 206 which communicates both sides of cylinder 110a. A valve rod 208 is secured at the end portion 48a of inner cylinder housing 46a and extends rearwardly therefrom through bore 206 and proximate to the cap 142a. The rod 208 is of a diameter to fit snugly within bore 206 with a slight amount of clearance such that movement of the piston 106a is not impeded. The rear portion 210 of the rod 208 is formed with a plurality of flats such as flat 212 whereby clearance is provided with the bore 206 (see FIGURE 5). The portion 210 extends for a distance whereby both sides of cylinder 110a are not in communication until the piston 106a is at its rearwardmost position. At this position the fluid pressure on the rod end of the piston 106a is relieved via the passageway provided by valve rod 208 and bore 206 with the fluid returning to the reservoir via bore 172a, passageway 188a, and a conduit member such as conduit 192 (FIGURES 1–3).

The rod 208 serves an additional function since it also prevents the piston 106a from rotating relative to the inner housing 46a. In order to prevent the inner housing 46a (together with drive piston 106a) from rotating relatively to the collet body 86a, a pin 212 is located in aligned slots formed in the outer surfaces of the end portion 56a of the collet housing 54a and of the forward portion 50a of the inner housing 46a. A slot, located in alignment with the latter slots, is formed in the rearmost leg of shell member 60a and receives a portion of pin 212 thereby preventing shells 60a and 62a from rotating.

While the tool 10a, as the tool 10, has specific advantages for applications in which little clearance is available, it also can be used in open areas in the same manner as conventional tools. In some of these applications many rivets, such as rivet 14, 14a, may be installed in a close area. In that case, with the tool assembly 10 of FIGURES 1–3, it might be impossible to set a fastener because of interference between the front surface 213 of anvil portion 76a and a previously set rivet such as rivet 14'a. To alleviate this problem, the tool 10a of FIGURE 4 is provided with an anvil member 78a which has a stand-off portion 214 which is of an enlarged diameter; the portion 214 projects forwardly from the front surface 213 a sufficient distance such that clearance is provided between front surface 213 and a previously set fastener such as 14'a. This distance should be approximately equal to the length of a swaged collar.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:

1. In a tool for applying a relative axial force between a pin member and a cooperating surface, said tool comprising: gripping means actuable for gripping the pin, engaging means for engaging the cooperating surface, pull means actuable for applying a relative force between said engaging means and said gripping means and means selectively actuable for actuating said gripping means and for actuating said pull means for and responsively to actuation of said gripping means.

2. In a tool for applying a relative axial force between a pin member and a cooperating surface, said tool comprising: gripping means actuable for gripping the pin, engaging means for engaging the cooperating surface, pull means actuable for applying a relative force between said engaging means and said gripping means, and piston means selectively actuable for actuating said gripping means and for actuating said pull means after actuation of said gripping means, said piston means including a first piston member actuable for actuating said gripping means and a second piston member operable for actuating said pull means.

3. In a tool for applying a relative axial force between a pin member and a cooperating surface, said tool comprising gripping means actuable for gripping the pin, engaging means for engaging the cooperating surface, pull means actuable for applying a relative force between said engaging means and said gripping means, piston means selectively actuable for actuating said gripping means and for actuating said pull means after actuation of said gripping means, said piston means including a first piston member actuable for actuating said gripping means and a second piston member operable for actuating said pull means, and means actuable by said first piston member for actuating said second piston member.

4. In a tool for applying a relative axial force betwen a pin member and a cooperating surface, said tool comprising: gripping means actuable for gripping the pin, engaging means for engaging the cooperating surface, pull means actuable for applying a relative force between said engaging means and said gripping means, first piston means selectively actuable for actuating said gripping means, said pull means including second piston means actuable for providing said relative force, and means actuable by said first piston means for actuating said second piston means.

5. In a tool for applying a relative axial force between a pin member and a cooperating surface, said tool comprising: gripping means actuable for gripping the pin, engaging means for engaging the cooperating surface, pull means actuable for applying a relative force between said engaging means and said gripping means, first piston means selectively actuable for actuating said gripping means, said first piston means including a reciprocably mounted first piston member, said pull means including a reciprocably mounted second piston member actuable for providing said relative force, and means actuable by movement of said first piston member in one direction for actuating said second piston member for movement in a first direction.

6. In a tool for applying a relative axial force between a pin member and a cooperating surface, said tool comprising: gripping means actuable for gripping the pin, engaging means for engaging the cooperating surface, and pull means actuable for applying a relative force between said engaging means and said gripping means along one direction, said gripping means including a plurality of jaw members movable relatively to each other in only a single direction substantially solely transversely of said one direction to engage the pin.

7. In a tool for applying a relative axial force between a pin member and a cooperating surface, said tool comprising: gripping means actuable for gripping the pin, engaging means for engaging the cooperating surface, pull means actuable for appyiing a relative force between said engaging means and said gripping means along one direction, said gripping means including a plurality of jaw members movable relatively to each other in only a single direction substantially solely transversely of said one direction to engage the pin, and means selectively actuable for actuating said gripping means and for actuating said pull means after actuation of said gripping means.

8. In a tool for applying a relative axial force between a pin member and a cooperating surface, said tool comprising: gripping means actuable for gripping the pin, engaging means for engaging the cooperating surface, pull means actuable for applying a relative force between said engaging means and said gripping means, first piston means selectively actuable for actuating said gripping means, said first piston means including a reciprocably mounted first piston member, said pull means including a reciprocably mounted second piston member actuable for providing said relative force, and means actuable by movement of said first piston member in one direction for actuating said second piston member for movement in a first direction, said gripping means including a fixed jaw member and a movable jaw member movable by said first piston member in a direction substantially solely transversely of said first direction.

9. In a tool for applying a relative axial force between a pin member and a cooperating surface, said tool comprising: a housing assembly having a first cylinder, gripping means supported in said housing assembly and actuable for gripping the pin, engaging means on said housing assembly for engaging the supporting surface, a drive piston located in said cylinder and reciprocable therein for applying a relative force along one direction between said engaging means and said gripping means, said drive piston having a piston head with a second cylinder, lock means operatively connected with said gripping means for actuating said gripping means and comprising a lock piston located in said second cylinder and reciprocable therein along said one direction for actuating said gripping means.

10. In a tool for applying a relative axial force between a pin member and a cooperating surface, said tool comprising: a housing assembly having a first cylinder, gripping means supported in said housing assembly and actuable for gripping the pin, engaging means on said housing assembly for engaging the cooperating surface, a drive piston located in said cylinder and reciprocable therein for applying a relative force along one direction between said engaging means and said gripping means, said drive piston having a piston head with a second cylinder, a lock piston located in said second cylinder and reciprocable therein along said one direction for actuating said gripping means, and means actuable by said lock piston for actuating said drive piston.

11. In a tool for applying a relative axial force between a pin member and a cooperating surface, said tool comprising: gripping means actuable for gripping the pin, engaging means for engaging the cooperating surface, pull means actuable for applying a relative force between said engaging means and said gripping means, first piston means selectively actuable for actuating said gripping means, said first piston means including a reciprocably mounted first piston member, said pull means including a reciprocably mounted second piston member actuable for providing said relative force, and means actuable by movement of said first piston member in one direction for actuating said second piston member for movement in a direction along the axis of said second piston member, said gripping means including a plurality of jaw members defining an opening for receiving the pin with said opening having an axis laterally spaced from the axis of said second piston member.

12. In a tool for applying a relative axial force between a pin member and a cooperating surface, said tool comprising: a housing assembly having a first cylinder, gripping means supported in said housing assembly and actuable for gripping the pin, engaging means on said housing assembly for engaging the supporting surface, a drive piston located in said cylinder and reciprocable therein for applying a relative force between said engaging means and said gripping means and in a direction along the axis of said drive piston, said drive piston having a piston head with a second cylinder, a lock piston located on said second cylinder and reciprocable therein for actuating said gripping means, said gripping means including a plurality of jaw members defining an opening for receiving the pin with said opening having an axis laterally spaced from the axis of said drive piston, said housing assembly defining an unconfined clearance space in the area immediately adjacent to said jaw members in a direction along said axis of said opening.

13. In a tool for applying a relative axial force between a pin member and a cooperating surface, said tool comprising: a longitudinally extending housing assembly having a first cylinder at one end having its axis extending longitudinally and a generally opened channel portion at its opposite end, said housing assembly terminating at said opposite end in a transversely extending anvil portion, an annular anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, a fixed jaw member fixed in said jaw housing portion and extending partially into said aperture, a diametrically oppositely disposed movable jaw member supported in said jaw housing portion for movement substantially solely transversely toward and away from said fixed jaw member for selectively gripping the pin of the fastener and operable for pulling the pin of the fastener as said collet member moves in a first longitudinal direction, a drive piston supported in said first cylinder and reciprocable along said first cylinder axis, said drive piston having a piston head located in said cylinder and having a second cylinder located therein coaxially with said first cylinder axis, said drive piston having an end portion extending coaxially, longitudinally from said piston head and fixed to said collet member, a lock piston supported in said second cylinder and reciprocable along said first cylinder axis, said piston member having a coaxially extending rod portion extending through said rod portion of said drive piston and within said collet member and into engagement with said movable jaw member for moving said movable jaw member transversely toward said fixed jaw member responsively to longitudinal movement of said lock piston in one direction, first fluid circuit means selectively actuable for driving said lock piston in said one direction, and second fluid circuit means operable responsively to movement of said lock piston in said one direction for driving said drive piston in said first direction.

14. In a tool for applying a relative axial force between a pin member and a cooperating surface, said tool comprising: a longitudinally extending housing assembly having a first cylinder at one end having its axis extending longitudinally and a generally opened channel portion at its opposite end, said housing assembly terminating at said opposite end in a transversely extending anvil portion, an annular anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, a fixed jaw member fixed in said jaw housing portion and extending partially into said aperture, a diametrically oppositely disposed movable jaw member supported in said jaw housing portion for movement substantially solely transversely toward and away from said fixed jaw member for selectively gripping the pin of the fastener and operable for pulling the pin of the fastener as said collet member moves in a first longitudinal direction, a drive piston supported in said first cylinder and reciprocable along said first cylinder axis, said drive piston having a piston head located in said cylinder and having a second cylinder located therein coaxially with a said first cylinder axis, said drive piston having an end portion extending coaxially, longitudinally from said piston head and fixed to said collet member, a lock position supported in said second cylinder and reciprocable along said first cylinder axis, said piston member having a coaxially extending rod portion extending through said rod portion of said drive piston and within said collet member and into engagement with said movable jaw member for moving said movable jaw member transversely toward said fixed jaw member responsively to longitudinal movement of said lock piston in one direction, first fluid circuit means selectively actuable for driving said lock piston in said one direction, and second fluid circuit means operable responsively to movement of said lock piston in said one direction for driving said drive piston in said first direction, said housing assembly defining an unconfined clearance space in the area immediately adjacent to said jaw members in a direction along the axis of said aperture on said jaw housing portion of said collet member.

15. In a tool for applying a relative axial force between a pin member and a cooperating surface, said tool comprising: a longitudinally extending housing assembly having a first cylinder at one end having its axis extending longitudinally and a generally opened channel portion at its opposite end, said housing assembly terminating at said opposite end in a transversely extending anvil portion, an annular anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, a fixed jaw member fixed in said jaw housing portion and extending partially into said aperture, a diametrically oppositely disposed movable jaw member supported in said jaw housing portion for movement substantially solely transversely toward and away from said fixed jaw member for selectively gripping the pin of the fastener and operable for pulling the pin of the fastener as said collet member moves in a first longitudinal direction, a drive piston supported in said first cylinder and reciprocable along said first cylinder axis, said drive piston having a piston head located in said cylinder and having a second cylinder located therein coaxially with said first cylinder axis, said drive piston having an end portion extending coaxially, longitudinally from said piston head and fixed to said collet member, a lock position supported in said second cylinder and reciprocable along said first cylinder axis, said piston member having a coaxially extending rod portion extending through said rod portion of said drive piston within said collet member and into engagement with said movable jaw member for moving said movable jaw member transversely toward said fixed jaw member responsively to longitudinal movement of said lock piston in one direction, first fluid circuit means selectively actuable for driving said lock piston in said one direction, second fluid cirucit means operable responsively to movement of said lock position in said one direction for driving said drive piston a selected distance in said one direction and being disabled responsively to movement of said drive piston said selected distance, and third fluid circuit means operable responsively to movement of said drive piston approximately said selected distance in said one direction for driving said drive piston in said one direction.

16. In a tool for applying a relative axial force between a pin member and a cooperating surface, said tool comprising: a longitudinally extending housing assembly having a first cylinder at one end having its axis extending longitudinally and a generally opened channel portion at its opposite end, said housing assembly terminating at said opposite end in a transversely extending anvil portion, an annular anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, a fixed jaw member fixed in said jaw housing portion and extending partially into said aperture, a diametrically oppositely disposed movable jaw member supported in said jaw housing portion for movement substantially solely transversely toward and away from said fixed jaw member for selectively gripping the pin of the fastener and operable for pulling the pin of the fastener as said collet member moves in a first longitudinal direction, a drive piston supported in said first cylinder and reciprocable along said first cylinder axis, said drive piston having a piston head located in said cylinder and having a second cylinder located therein coaxially with said first cylinder axis, said drive piston having an end portion extending coaxially, longitudinally from said piston head and fixed to said collet member, a lock piston supported in said second cylinder and reciprocable along said first cylinder axis, said piston member having a coaxially extending rod portion extending through said rod portion of said drive piston and within said collet member and into engagement with said movable jaw member for moving said movable jaw member transversely toward said fixed jaw member responsively to longitudinal movement of said lock piston in one direction, first fluid circuit means selectively actuable for driving said lock piston in said one direction, second fluid circuit means operable responsively to movement of said lock piston in said one direction for driving said drive piston a selected distance in said one direction and being disabled responsively to movement of said drive piston said selected distance, and third fluid circuit means operable responsively to movement of said drive piston approximately said selected distance in said one direction for driving said drive piston in said one direction, fourth fluid crcuit means selectively operable for driving said lock piston in an opposite direction, fifth fluid circuit means including said fourth fluid circuit means selectively operable for driving said drive piston in an opposite direction.

17. In a tool for applying a relative axial force between a pin member and a cooperating surface, said tool comprising: a longitudinally extending housing assembly having a first cylinder at one end having its axis extending longitudinally and a generally opened channel portion at its opposite end, said housing assembly terminating at said opposite end in a transversely extending anvil portion, an annular anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, a fixed jaw member fixed in said jaw housing portion and extending partially into said aperture, a diametrically oppositely disposed movable jaw member supported in said jaw housing portion for movement substantially solely transversely toward and away from said fixed jaw member for selectively gripping the pin of the fastener and operable for pulling the pin of the fastener as said collet member moves in a first longitudinal direction, a drive piston supported in said first cylinder and reciprocable along said first cylinder axis, said drive piston having a piston head located in said cylinder and having a second cylinder located therein coaxially with said first cylinder axis, said drive piston having an end portion extending coaxially, longitudinally from said piston head and fixed to said collet member, a lock piston supported in said second cylinder and reciprocable along said first cylinder axis, said piston member having a coaxially extending rod portion extending through said rod portion of said drive piston and within said collet member and into engagement with said movable jaw member for moving said movable jaw member transversely toward said fixed jaw member responsively to longitudinal movement of said lock piston in one direction, first fluid circuit means selectively actuable for driving said lock piston in said one direction, second fluid circuit means operable responsively to movement of said lock piston in said one direction for driving said drive piston a selected distance in said one direction and being disabled responsively to movement of said drive piston said selected distance, and third fluid circuit means operable responsively to movement of said drive piston approximately said selected distance in said one direction for driving said drive piston in said one direction, fourth fluid circuit means selectively operable for driving said lock piston in an opposite direction, fifth fluid circuit means including said fourth fluid circuit means selectively operable for driving said drive piston in an opposite direction, said housing assembly defining an unconfined clearance space in the area immediately adjacent to said jaw members in a direction along the axis of said aperture in said jaw housing portion of said collet member.

18. In a tool for applying a relative axial force between a pin member and a cooperating surface, said tool comprising gripping means actuable for gripping the pin, engaging means for engaging the cooperating surface, drive piston means actuable for reciprocation in a first direction for applying a relative force between said engaging means and said gripping means with said gripping means pulling the pin and in a second direction with said means pushing the pin, lock piston means actuable for reciprocation between first and second positions and operable with said gripping means for actuating said gripping means to grip the pin on movement to said first position and to release the pin on movement to said second position, first fluid circuit means selectively actuable for driving said lock piston means to said first position, and second fluid circuit means operable responsively to movement of said lock piston means to said first position for driving said drive piston in one of said first and second directions.

19. In a tool for applying a relative axial force between a pin member and a cooperating surface, said tool comprising: gripping means actuable for gripping the pin, engaging means for engaging the cooperating surface, drive piston means actuable for reciprocation in a first direction for applying a relative force between said engaging means and said gripping means with said gripping means pulling the pin and in a second direction with said gripping means pushing the pin, lock piston means actuable for reciprocation between first and second positions and operable with said gripping means for actuating said gripping means to grip the pin on movement to said first position and to release the pin on movement to said second position, first fluid circuit means selectively actuable for driving said lock piston means to said first position, second fluid circuit means operable responsively to movement of said lock piston to said first position for driving said drive piston a selected distance in said first direction and being disabled responsively to movement of said drive piston said selected distance, and third fluid circuit means operable responsively to movement of said drive piston approximately said selected distance in said first direction for driving said drive pistion in said first direction.

20. In a tool for applying a relative axial force between a pin member and a cooperating surface, said tool comprising: gripping means actuable for gripping the pin, engaging means for engaging the cooperating surface, drive piston means actuable for reciprocation in a first direction for applying a relative force between said engaging means and said gripping means with said gripping means pulling the pin and in a second direction with said gripping means pushing the pin, lock piston means actuable for reciprocation between first and second positions and operable with said gripping means for actuating said gripping means to grip the pin on movement to said first position and to release the pin on movement to said second position, first fluid circuit means selectively actuable for driving said lock piston means to said first position, second fluid circuit means operable responsively to movement of said lock piston means to said first position for driving said drive piston means a selected distance in said first direction and being disabled responsively to movement of said drive piston said selected distance, and third fluid circuit means operable responsively to movement of said drive piston approximately said selected distance in said first direction for driving said drive piston in said first direction, fourth fluid circuit means selectively operable for driving said lock piston to said second position, and fifth fluid circuit means including said fourth fluid circuit means selectively operable for driving said drive piston in said second direction.

21. In a tool for setting a two-piece fastener of the type comprising a pin and a collar by swaging the collar to the pin, said tool comprising: gripping means actuable for gripping the pin, swaging means located at the forward end of said tool and engageable with the collar and actuable for swaging the collar onto the pin, pull means actuable for applying a relative force between said swaging means and said gripping means, first piston means selectively actuable for actuating said gripping means, said first piston means including a reciprocably mounted first piston member, said pull means including a reciprocably mounted second piston member actuable for providing said relative force, and means actuable by movement of said first piston member in one direction for actuating said second piston member for movement in a direction along the axis of said second piston member, said gripping means including a plurality of jaw members defining an opening for receiving the pin with said opening having an axis laterally spaced from the axis of said second piston member, said swaging means including a swaging anvil extending beyond the forwardmost surface of the remainder of said tool a distance approximately equal to the length of a swaged collar.

22. In a tool for setting a two-piece fastener of the type comprising a pin and a collar by swaging the collar to the pin, said tool comprising: a housing assembly having a first cylinder, gripping means supported in said housing assembly and actuable for gripping the pin, swaging means located at the forward end of said tool and engageable with the collar and actuable for swaging the collar onto the pin, a drive piston located in said cylinder and reciprocable therein for applying a relative force between said swaging means and said gripping means and in a direction along the axis of said drive piston, said drive piston having a piston head with a second cylinder, a lock piston located in said second cylinder and reciprocable therein for actuating said gripping means, said gripping means including a plurality of jaw members defining an opening for receiving the pin with said opening having an axis laterally spaced from the axis of said drive piston, said housing assembly terminating at its forward end in a front surface extending transversely of said axes and defining an unconfined clearance space in the area immediately adjacent to said jaw members in a direction along said axis of said opening, said swaging means including a swaging anvil extending beyond said front face a distance approximately equal to the length of a swaged collar.

23. In a tool for applying a relative axial force between a pin member and a cooperating surface, said tool comprising: gripping means actuable for gripping the pin, engaging means for engaging the cooperating surface, pull means actuable for applying a relative force between said engaging means and said gripping means, means selectively actuable for actuating said gripping means and for actuating said pull means responsively to and after actuation of said gripping means, said pull means including a drive piston reciprocably mounted in a cylinder, and means for fluid communicating said cylinder on opposite sides of said piston responsively to movement of said piston to a selected position in said cylinder.

24. In a tool for applying a relative axial force between a pin member and a cooperating surface, said tool comprising: a housing assembly having a first cylinder, gripping means supported in said housing assembly and actuable for gripping the pin, engaging means on said housing assembly for engaging the supporting surface, a drive piston located in said cylinder and reciprocable therein for applying a relative force along one direction between said engaging means and said gripping means, said drive piston having a piston head with a second cylinder lock means operatively connected with said gripping means for actuating said gripping means and comprising a lock piston located in said second cylinder and reciprocable therein along said one direction for actuating said gripping means and valve means for fluid communicating said first cylinder on opposite sides of said drive piston with said drive piston in an extreme position along said one direction.

25. In a tool for applying a relative axial force between a pin member and a cooperating surface, said tool comprising: a longitudinally extending housing assembly having a first cylinder at one end having its axis extending longitudinally and a generally opened channel portion at its opposite end, said housing assembly terminating at said opposite end in a transversely extending anvil portion, an annular anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, a fixed jaw member fixed in said jaw housing portion and extending partially into said aperture, a diametrically oppositely disposed movable jaw member supported in said jaw housing portion for movement substantially solely transversely toward and away from said fixed jaw member for selectively gripping the pin of the fastener and operable for pulling the pin of the fastener as said collet member moves in a first longitudinal direction, a drive piston supported in said first cylinder and reciprocable along said first cylinder axis, said drive piston having a piston head located in said cylinder and having a second cylinder located therein coaxially with said first cylinder axis, said drive piston having an end portion extending coaxially, longitudinally from said piston head and fixed to said collet member, a lock piston supported in said second cylinder and reciprocable along said first cylinder axis, said piston member having a coaxially extending rod portion extending through said rod portion of said drive piston and within said collet member and into engagement with said movable jaw member for moving said movable jaw member transversely toward said fixed jaw member responsively to longitudinal movement of said lock piston in one direction, valve means for fluid communicating said first cylinder on opposite sides of said drive piston with said drive piston in its extreme position along said first cylinder axis whereby said collet member has moved in said first longitudinal direction, first fluid circuit means selectively actuable for driving said lock piston in said one direction, and second fluid circuit means operable responsively to movement of said lock piston in said one direction for driving said drive piston in said first direction.

26. In a tool for applying a relative axial force between a pin member and a cooperating surface, said tool comprising: a longitudinally extending housing assembly having a first cylinder at one end having its axis extending longitudinally and a generally opened channel portion at its opposite end, said housing assembly terminating at said opposite end in a transversely extending anvil portion, an annular anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, a fixed jaw member fixed in said jaw housing portion and extending partially into said aperture, a diametrically oppositely disposed movable jaw member supported in said jaw housing portion for movement substantially solely transversely toward and away from said fixed jaw member for selectively gripping the pin of the fastener and operable for pulling the pin of the fastener as said collet member moves in a first longitudinal direction, a drive piston supported in said first cylinder and reciprocable along said first cylinder axis, said drive piston having a piston head located in said cylinder and having a second cylinder located therein coaxially with said first cylinder axis, said drive piston having an end portion extending coaxially, longitudinally from said piston head and fixed to said collet member, a lock piston supported in said second cylinder and reciprocable along said first cylinder axis, said piston member having a coaxially extending rod portion extending through said rod portion of said drive piston and within said collet member and into engagement with said movable jaw member for moving said movable jaw member transversely toward said fixed jaw member responsively to longitudinal movement of said lock piston in one direction, means operatively associated with said housing assembly, said first piston member and said collet member for preventing relative rotation therebetween, first fluid circuit means selectively actuable for driving said lock piston in said one direction, and second fluid circuit means operable responsively to movement of said lock piston in said one direction for driving said drive piston in said first direction.

27. In a tool for applying a relative axial force between a pin member and a cooperating surface, said tool comprising: a longitudinally extending housing assembly having a first cylinder at one end having its axis extending longitudinally and a generally opened channel portion at its opposite end, said housing assembly terminating at said opposite end in a transversely extending anvil portion, and annular anvil member fixedly supported on said anvil portion and engageable with the cooperating surface and having an opening having an axis laterally spaced from said first cylinder axis, a collet member supported in said channel portion of said housing assembly for longitudinal movement, said collet member having a transversely extending jaw housing portion having an aperture located coaxially with said anvil member, jaw means located in said jaw housing portion and operable for movement substantially solely transversely into and out of said aperture for selectively gripping the pin of the fastener and operable for pulling the pin of the fastener as said collet member moves in a first longitudinal direction, a drive piston supported in said first cylinder and reciprocable along said first cylinder axis in said cylinder and having a second cylinder located therein coaxially and having an end portion extending coaxially, longitudinally from said piston head and fixed to said collet member, said anvil portion and said jaw housing portion being of a minimum width on a longitudinal direction with said housing assembly defining an unconfined clearance space in the area immediately adjacent to said anvil portion whereby the tool can be used in small clearance areas.

References Cited by the Examiner

UNITED STATES PATENTS 3,042,245    7/62    Schwartz    218—42
3,105,416    10/63    Van Hecke    218—42

GRANVILLE Y. CUSTER, JR., *Primary Examiner.*

UNITED STATES PATENT OFFICE
CERTIFICATE OF CORRECTION

Patent No. 3,197,840                                        August 3, 1965

George J. Van Hecke

It is hereby certified that error appears in the above numbered patent requiring correction and that the said Letters Patent should read as corrected below.

Column 1, line 59, for "this" read -- the --; column 5, line 35, for "within" read -- with --; column 6, line 2, for "thence" read -- hence of --; line 34, strike out "that"; column 9, line 2, for "iin" read -- in --; line 4, for "located" read -- locatable --; line 5, after "is" insert -- also --; line 30, for "of" read -- or --; same column 9, line 40, for "for", second occurrence, read -- after --; column 13, lines 17 and 28, for "position", each occurrence, read -- piston --; line 27, for "cirucit" read -- circuit --; column 15, line 3, after "said" insert -- gripping --; line 36, for "pistion" read -- piston --.

Signed and sealed this 29th day of March 1966.

(SEAL)
Attest:

ERNEST W. SWIDER                                        EDWARD J. BRENNER
Attesting Officer                                          Commissioner of Patents